(12) United States Patent
Witt et al.

(10) Patent No.: US 9,154,318 B2
(45) Date of Patent: *Oct. 6, 2015

(54) SERVER ARBITRATED RELIABLE MULTICAST SYSTEM AND A PROCESS FOR ACCESSING THE SAME

(71) Applicant: Vectormax Corporation, Farmingdale, NY (US)

(72) Inventors: Daniel Witt, Wheaton, IL (US); Timothy Lottes, Downers Grove, IL (US); James F. Kost, Westmont, IL (US)

(73) Assignee: Vectormax Corporation, Farmingdale, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,002

(22) Filed: Sep. 20, 2013

(65) Prior Publication Data

US 2014/0022888 A1      Jan. 23, 2014

Related U.S. Application Data

(60) Division of application No. 11/673,639, filed on Feb. 12, 2007, now Pat. No. 8,542,680, and a continuation of application No. 10/201,425, filed on Jul. 23, 2002, now Pat. No. 7,177,312.

(60) Provisional application No. 60/307,822, filed on Jul. 25, 2001.

(51) Int. Cl.
*H04L 12/28* (2006.01)
*H04L 12/18* (2006.01)

(52) U.S. Cl.
CPC ............ *H04L 12/1868* (2013.01); *H04L 12/18* (2013.01); *H04L 12/1877* (2013.01)

(58) Field of Classification Search
USPC ............... 714/748, E11.113, 18; 375/E7.016, 375/E7.013; 709/231, 217, 203, 219, 202, 709/228, 229, 246; 370/216, 342, 394
See application file for complete search history.

(56) References Cited

U.S. PATENT DOCUMENTS

| 7,177,312 | B2 * | 2/2007 | Witt et al. | 370/394 |
| 8,542,680 | B2 * | 9/2013 | Witt et al. | 370/390 |
| 2002/0048275 | A1 * | 4/2002 | Atwater et al. | 370/409 |
| 2014/0022888 | A1 * | 1/2014 | Witt et al. | 370/216 |

* cited by examiner

*Primary Examiner* — Phuongchau Ba Nguyen
(74) *Attorney, Agent, or Firm* — Jack Schwartz and Associates, PLLC

(57) ABSTRACT

A system and a process for a session layer protocol allows a large number of client machines to receive a reliable data stream over inherently unreliable multicast connections in a highly efficient and scalable manner. More specifically, streaming of high-quality video, audio, stock and news tickers, or any other application specific data that requires a reliable data stream is described. The streaming allows for the source to instruct individuals to drop their connection to the stream to prevent noisy individuals from disrupting the operating efficiency of the stream.

6 Claims, 4 Drawing Sheets

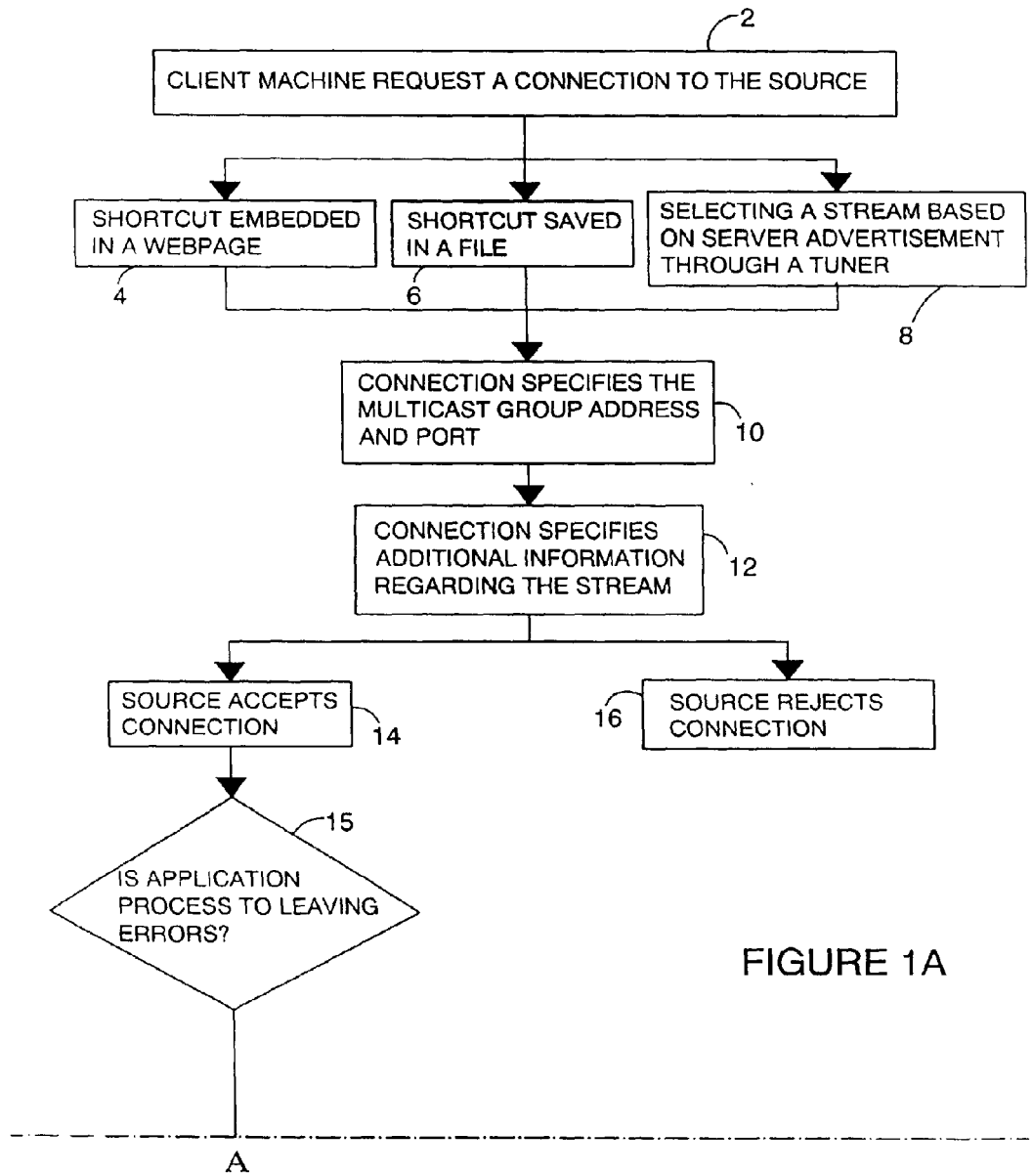

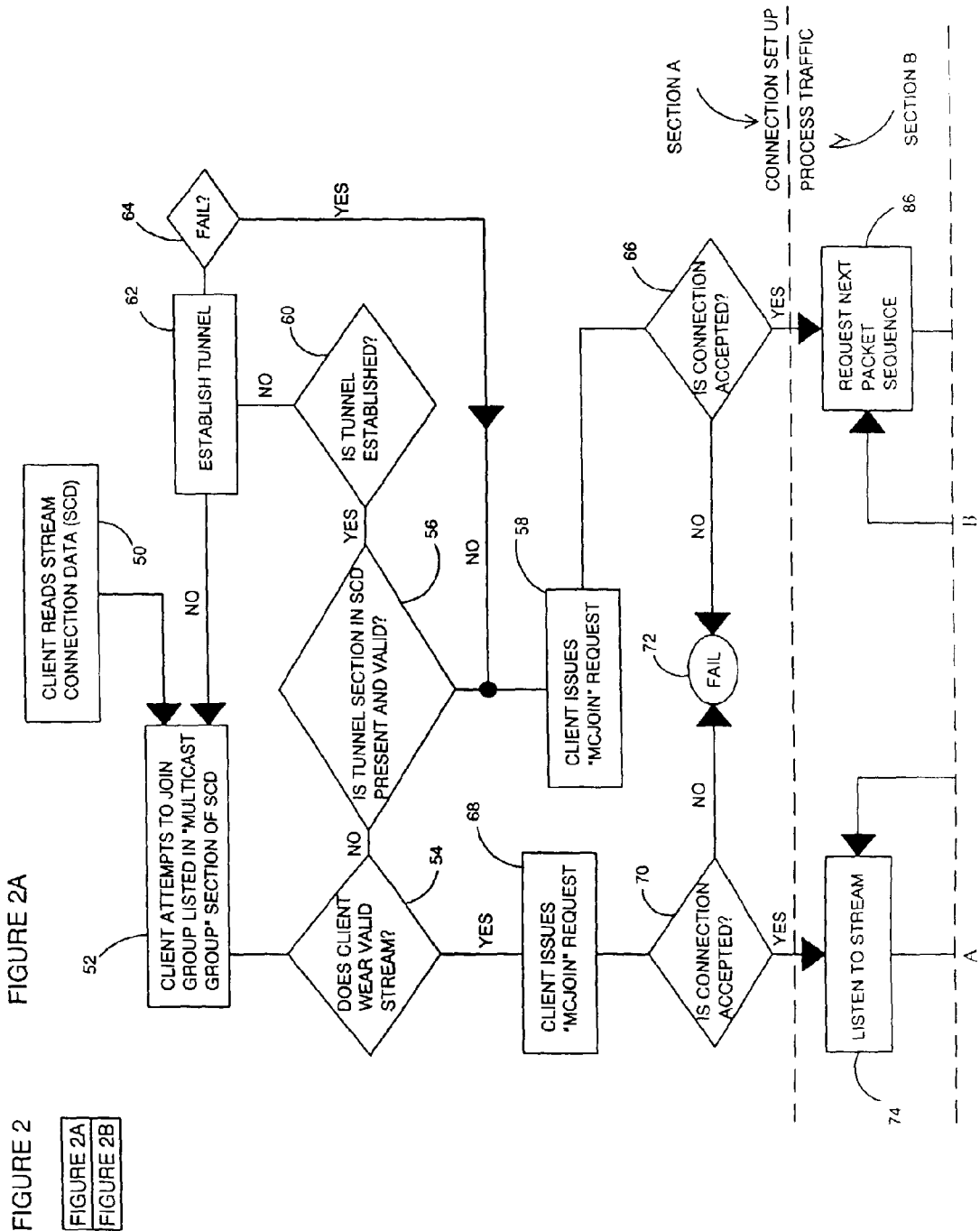

SERVER ARBITRATED RELIABLE MULTICAST SYSTEM AND A PROCESS FOR ACCESSING THE SAME

CROSS REFERENCE TO RELATED APPLICATIONS

This application is a divisional application of U.S. patent application Ser. No. 11/673,639 filed on Feb. 12, 2007 and which issued as U.S. Pat. No. 8,542,680 on Sep. 24, 2013, and which is a Continuation Application of U.S. patent application Ser. No. 10/201,425 filed on Jul. 23, 2002 and issued as U.S. Pat. No. 7,177,312 on Feb. 13, 2007 which claims priority from U.S. Provisional Patent Application Ser. No. 60/307,822 filed on Jul. 25, 2001.

BACKGROUND OF THE INVENTION

The present invention generally relates to a system and a process for a session layer protocol that allows a large number of client machines to receive a reliable data stream over inherently unreliable multicast connections in a highly efficient and scalable manner. More specifically, the present invention enables streaming of high-quality video, audio, stock and news tickers, or any other application specific data that requires a reliable data stream. Further, the streaming of the present invention allows for the source to instruct individuals to drop their connection to the stream to prevent noisy individuals from disrupting the operating efficiency of the stream.

Of course, providing streaming video across, for example, a T1 line is known. Currently, streaming video is expensive, and limitations are present due to the costs associated with streaming video and/or the time associated with performing the same.

A need, therefore, exists for providing an improved system and process for streaming video that is faster and cheaper than current processes.

SUMMARY OF THE INVENTION

The present invention generally relates to a system and a process for a session layer protocol that allows a large number of client machines to receive a reliable data stream over inherently unreliable multicast connections in a highly efficient and scalable manner. More specifically, the present invention enables streaming of high-quality video, audio, stock and news tickers, or any other application specific data that requires a reliable data stream. Further, the streaming of present invention allows for the source to instruct individuals to drop their connection to the stream in order to prevent a few noisy individuals from disrupting the operating efficiency of the stream.

To this end, in an embodiment of the present invention, a server arbitrated reliable multicast system for a session layer protocol for error detection and recovery is provided. The system has a machine, a source, a connection from the machine to the source, a shortcut for connecting the machine to the source; a multicast group address and port associated with the machine; a stream connecting the machine to the source via the multicast group address and port; and information associated with the machine.

In an embodiment, the system further has a packet size associated with the information.

In an embodiment, the system further has a stream bandwidth requirement associated with the information.

In an embodiment, the system further has multicast tunneling associated with the information.

In an embodiment, the information is application specific.

In an embodiment, the shortcut is embedded in a web page.

In an embodiment, the shortcut is saved in a file.

In an embodiment, the stream is based on a server advertisement received through a tuner associated with the machine.

In another embodiment of the present invention, a process for a session layer protocol is provided. The process has the steps of: providing a machine; providing a source associated with the machine; requesting a connection to the source of the machine; sending a stream over the connection; detecting data in the stream; and determining whether to accept or reject the connection by the source based on the detected data.

In an embodiment, the process further has the step of specifying information associated with the stream.

In an embodiment, the information associated with the stream includes packet size.

In an embodiment, the information associated with the stream includes stream bandwidth requirements.

In an embodiment, the information associated with the stream includes multicast tunneling information.

In an embodiment, the information associated with the stream includes application specific information.

In an embodiment, the data in the stream is associated with an error in the stream.

In an embodiment, the data in the stream is associated with extraneous data in the stream.

In an embodiment, the extraneous data includes data that causes a disruption of service.

In an embodiment, the process further has the step of accepting the connection by the source.

In an embodiment, the process further has the steps of initiating a passive connection if the passive connection is associated with the stream with no error correction performed; joining the machine to an appropriate group; and receiving packets from the passive connection.

In an embodiment, the process further has the step of determining proper ordering and buffer placement of each of the received packets.

In an embodiment, the process further has the step of ensuring each of the packets received is the next one expected.

In an embodiment, the process further has the step of dropping each of the packets from the stream not received within a pre-determined amount of time.

In an embodiment, the process further has the step of requesting each of the packets dropped from the stream if the packets are not received.

In an embodiment, the request for each of the packets dropped from the stream includes a length of sequence of each of the dropped packets.

In an embodiment, the process further has the step of receiving each of the dropped packets.

In an embodiment, the process further has the step of repeating the request for each of the packets dropped from the stream until each of the dropped packets are received.

In an embodiment, the process further has the step of specifying a multicast group address by the connection.

In an embodiment, the process further has the step of specifying a port by the connection.

In an embodiment, the process further has the step of sending the stream over a specified multicast group address and port.

In an embodiment, the process further has the step of requesting packets from the stream.

In an embodiment, the process further has the step of selecting the stream based on server advertisements through a tuner in a client application to request the connection.

In an embodiment, the process further has the step of rejecting the connection of the source.

In an embodiment, the decision to accept or reject the connection by the source is based on the load on a error recovery server in relation to the availability of server processing and bandwidth assets.

In an embodiment, the process further has the step of alerting an end user to an initiation of a passive connection in which no error correction is performed.

In an embodiment, the process further has the steps of receiving packets from the connection; and determining the proper ordering and the buffer placement of each received packet based on embedded information in each received packet.

In an embodiment, the process further has the step of repeating the request for a connection to the source of the machine until a buffer time runs out.

In an embodiment, the process further has the step of notifying the source that the buffer time has run out.

In an embodiment, the process further has the step of dropping the connection of the source in response to the notification that the buffer time has run out.

In an embodiment, the process further has the step of interpolating data of the source in response to the notification that the buffer time has run out.

In an embodiment, the process further has the step of placing lost packets into the buffer placement in response to the notification that the buffer time has run out.

In an embodiment, the process further has the step of sending lost packets to the source.

In an embodiment, the process further has the step of receiving a message indicating a connection drop.

In an embodiment, the process further has the step of requesting a multicast tunnel associated with the connection to an upstream network using a standard tunneling protocol.

In an embodiment, the process further has the step of routing multicast traffic associated with the connection over a virtual tunnel interface.

In an embodiment, the process further has the step of requesting a conventional connection by requesting adjacent packet sequences from an error recovery server at the source.

In another embodiment of the present invention, a process for a session layer protocol is provided. The process has the steps of: providing a machine; providing a source associated with the machine; using a shortcut to request a connection to the source of the machine; sending a stream over the connection; deciding to accept or reject the connection by the source; accepting the connection by the source; initiating a passive connection if the passive connection is associated with the stream with no error correction performed; joining the machine to an appropriate group; receiving packets from the passive connection; determining proper ordering and buffer placement of each of the received packets; dropping each of the packets from the stream not received within a pre-determined amount of time; requesting each of the packets dropped from the stream if the packets are not received; and receiving each of the dropped packets.

In an embodiment, the process further has the step of ensuring each of the packets received is the next one expected.

In an embodiment, the process further has the step of detecting errors in the stream.

In an embodiment, the process further has the step of detecting extraneous data in the stream.

In an embodiment, the process further has the step of embedding the shortcut in a web page.

In an embodiment, the process further has the step of saving the shortcut in a file.

In another embodiment of the present invention a process for a session layer protocol applied to missed packet sequences or arbitrary length sequences is provided. The process has the steps of: providing a machine; reading a stream connection data from the machine; providing a multicast group associated with the stream connection data; attempting to join a group associated with the multicast group; determining if a valid stream of the stream connection data is present; issuing a request to join a group if the valid stream is present; testing if a tunnel section is present and valid in the stream connection data if a valid stream is not present; issuing a request to join a tunnel section if the tunnel section is not present and valid in the stream connection data; determining if a tunnel interface is possible; creating a tunnel as needed if no tunnel is present; attempting to join the group associated with the multicast group if the tunnel does not fail; issuing a request to join the tunnel section if the tunnel section fails; determining if the stream connection data is accepted; recognizing a failure if the stream connection data is refused; testing if the sequence is error free; requesting a retransmission if an error is found; and recognizing an end of the stream.

In an embodiment, the process further has the step of creating the tunnel as needed by a client.

In an embodiment, the process further has the step of creating the tunnel as needed by an intermediate service provider.

In an embodiment, the process further has the step of testing validity of the retransmission.

In an embodiment, the process further has the step of requesting another retransmission if the retransmission received is not valid and a buffer time has not expired.

In an embodiment, the process further has the step of triggering an alert application layer if the buffer time expires.

In an embodiment, the alert application layer includes dropping the connection.

In an embodiment, the alert application layer includes pausing.

In an embodiment, the alert application layer includes interpolating data.

In an embodiment, the alert application layer includes ignoring lost data.

In an embodiment, the process further has the step of ending the session layer protocol if an end of stream packet is received without error.

It is, therefore, an advantage of the present invention to provide a system and process for a cost efficient streaming video.

Another advantage of the present invention is that it may provide a system and process for a time efficient streaming video.

Another advantage of the present invention is to provide a system and process for error detection and recovery at the session layer thereby allowing applications to benefit from increased reliability while allowing for standard network layer error correction protocols to function properly.

Yet another advantage of the present invention is to provide a system and process for detecting errors and/or extraneous data.

Further, an advantage of the present invention is to provide a system and process for detection of third party intentionally inserted or modified data that may cause a disruption of service.

Still further, an advantage of the present invention is to provide a system and process for shortcut to find the resource independent of which server it resides on. The shortcut contains information that allows an application to determine whether independently or with the assistance of a directory the most efficient source of the desired content.

Another advantage of the present invention is to provide a system and process that relies on dynamic tunnels that are created as needed by clients or intermediate service providers.

Additional features and advantages of the present invention are described in, and will be apparent from, the detailed description of the presently preferred embodiments and from the drawings.

BRIEF DESCRIPTION OF THE DRAWINGS

FIG. 1 illustrates a black box diagram of FIGS. 1A and 1B.

FIGS. 1A and 1B illustrate a flowchart of a server arbitrated reliable multicast process in an embodiment of the present invention.

FIG. 2 illustrates a black box diagram of FIGS. 2A and 2B.

FIGS. 2A and 2B illustrate a flowchart of a server arbitrated reliable multicast process in an embodiment of the present invention.

DETAILED DESCRIPTION OF THE PRESENTLY PREFERRED EMBODIMENTS

Figure 1B:
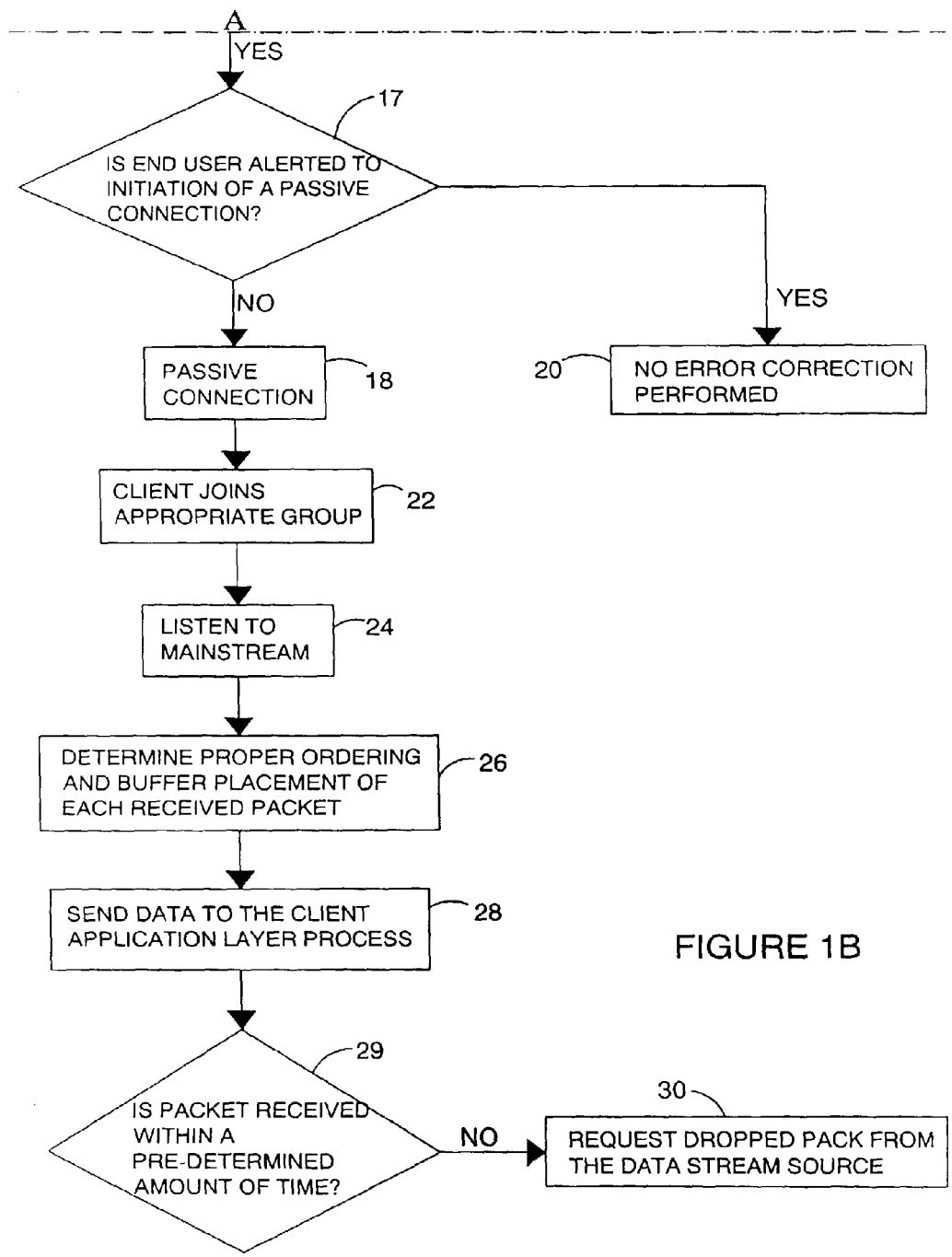

The present invention generally relates to a server arbitrated reliable multicast system and process for using the same. The server arbitrated reliable multicast system has a session layer protocol that may allow a large number of client machines to receive a reliable data stream over inherently unreliable multicast connections in a highly efficient and scalable manner. More specifically, the present invention may enable streaming of high-quality video, audio, stock and news tickers, or any other application specific data that requires a reliable data stream. Further, the streaming of the present invention may allow for the source to instruct individuals to drop their connection to the stream to prevent noisy individuals from disrupting the operating efficiency of the stream.

The session layer protocol may allow for client machines to automatically detect their connection state, such as, for example, same multicast domain, not on the same multicast domain—tunneling available, or not on same multicast domain—tunneling not available. The multicast domain is a collection of networks, or internetworks over which a multicast from an arbitrary point may be received at any point within the collection. Client machines may also connect to a source in the most efficient manner possible.

A source, as defined by the present invention, is one or more servers residing either in the same machine or in the same well-connected environment as the server responsible for origination of the data to be transmitted using the server arbitrated reliable multicast system of the present invention. A server, as defined by the present invention, is a software process responsible for a specific task. A server may or may not run on a machine dedicated to running it. A well-connected environment, as defined by the present invention, is a network segment or group of network segments where the party responsible for maintaining the data integrity believes the likelihood of missing or erred packets occurring between machines in that environment to be relatively low.

A hook is a method by which an application or process may access the services provided by another. The session layer protocol may provide multiple hooks to allow sequential processing of data by multiple upper layer protocols. Sequential processing of data by multiple upper layer protocols may allow for rapid integration of data encryption, user authorization, or other application specific data formatting or access mechanisms. Further, the session layer protocol may also use generic transport layer hooks, allowing the session layer protocol to easily modify the multiple hooks to function over any lower layer protocol stack that supports multicasting, such as, for example, UDP/IP, IPX, LANE, etc.

The session layer protocol may have special information embedded in the data stream, connection shortcuts, stream advertisements, and the special data stream and frame formatting specifications. The session layer protocol may also encompass the methods in which the special information is used to provide a reliable data stream, the lightweight application layer interface, and the seamless efficiency optimization supplied by the present invention.

Turning now to FIGS. 1A and 1B, the process for the session layer protocol is generally illustrated. A client machine may request a connection to a source via step 2. The client machine may request a connection to the source using a shortcut, such as, for example, a shortcut embedded in a web page, via step 4, or, for example, through a shortcut saved in a file, via step 6. The client machine may also request a connection by selecting a stream based on server advertisements through a tuner in the client application, via step 8.

After the client machine requests a connection to the source, the connection may specify the multicast group address and port over which the desired stream is sent via step 10. The connection may also specify additional information regarding the stream via step 12. Additional information regarding the stream may be, for example, packet size, stream bandwidth requirements, multicast tunneling information, or application specific information. The source may either accept the connection via step 14 or reject the connection via step 16. Normally the decision to accept the connections is based on the load on the error recovery server in relation to the availability of server processing and bandwidth assets, but may be based on some other application specific metric. If the application layer process is tolerant of errors, via step 15, for example, in applications such as a new or stock ticker, the client server arbitrated reliable multicast of the present invention may initiate a passive connection, in which the main stream is available but no error correction is performed, via step 18. However, an end user may be alerted to the initiation of a passive connection, via step 17, in which no error correction is performed, via step 20, as application performance may be greatly reduced when compared to typical usage.

The client machine may join the appropriate group, via step 22, and may begin listening to main stream via step 24. Each packet in the stream may have embedded special information to allow the client server arbitrated reliable multicast of the present invention, to determine the proper ordering and buffer placement of each received packet via step 26. With information regarding the proper ordering and buffer placement of each received packet, the process for the session layer protocol ensures that each packet received is the next one expected.

After receiving any application specific "stream join point" message and a predetermined amount of buffer time the client server arbitrated reliable multicast process of the present invention begins sending data to the client application layer process via step 28. If an expected packet is not received within a predetermined length of time, the client server arbitrated reliable multicast of the present invention process requests the dropped packet from the data stream source, via step 30. The expected packet may not be received within a predetermined length of time either because the packet was lost in transmission or because a lower level protocol detected the packet was erred and discarded it.

In an alternative embodiment, the process for the session layer protocol may also apply to missed packet sequences or arbitrary length. However, the request to the server for retransmission must also include the length of that sequence. If the retransmission is not received within a predefined amount of time, it is repeatedly requested until the packets are successfully received or the buffer time runs out. If the later occurs, the client server arbitrated reliable multicast of the present invention process notifies the application layer process. The application layer's response to this notification is application specific but may include dropping the connection, pausing, interpolation of data, ignoring lost data, or any other process deemed appropriate by the application designer.

Since buffer location is determined by the special sequence information in the packet the buffer locations for the dropped packets is guaranteed to be free. The client server arbitrated reliable multicast process of the present invention may put lost packets into appropriate buffer position and sends them to the application layer process. The client server arbitrated reliable multicast of the present invention may also receive a "drop connection" message instead of a normal response to a retransmission request. Normally this should result in the user being alerted and the stream closed, but may also cause a switch to a passive connection as described previously. The process to decide to send "drop connection" messages is closely related to the process for connection set up. Which clients are dropped is normally based on the number of previous error recovery requests, but may also be based on application specific metrics, such as a service level agreement between a particular client and the content provider.

In certain special circumstances, such as when the client is connected to a network that does not support multicast, or does not support multicast from the source a client may request a multicast tunnel to an upstream (i.e. closer to the stream's source) network using, for example, PPTP, L2TP, mRouted, mTunnel, MTUN, or other standard tunneling protocol. In this case, the process functions as described previously with the exception that all multicast traffic is routed over virtual tunnel interface instead of a physical interface on the machine.

In certain special circumstances, such as when the client is connected to a network that does not support multicast, or does not support multicast from the source, and there is no upstream network that supports multicast tunneling the client may request a conventional connection to the server. The user should be alerted when this occurs as it places a higher bandwidth demand on the server and should be one of the first connections dropped if load on the source gets high. This conventional connection is facilitated through requesting adjacent packet sequences from the error recovery server at the stream source. This type of connection normally requires special authorization form the server before it is accepted.

Figure 2B:
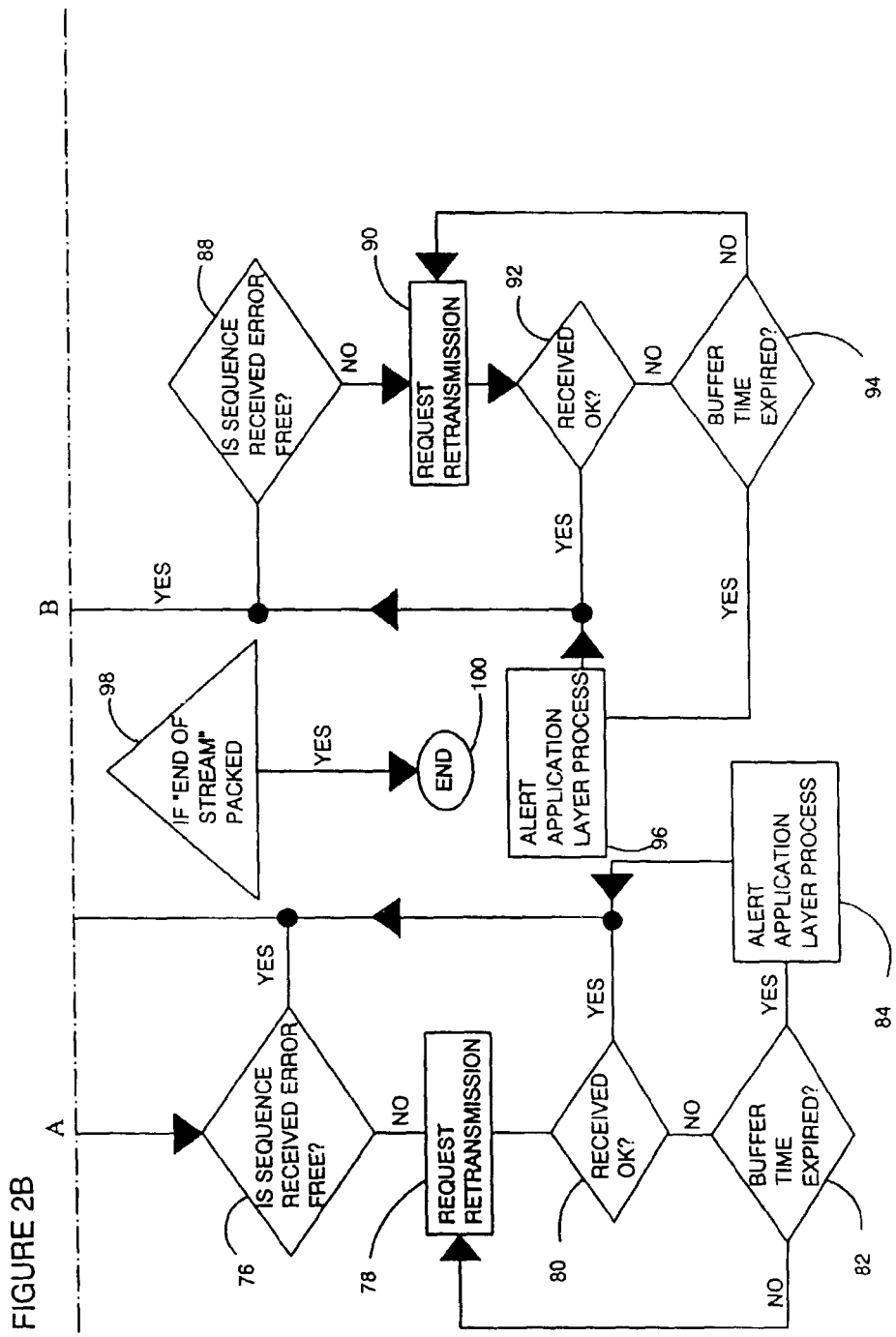

Referring now to FIGS. 2A and 2B, a flowchart generally illustrates the process for the session layer protocol applied to missed packet sequences or arbitrary length sequences, as described above. A client machine may read the stream connection data (SCD) via step 50. Next, the client may attempt to join a group listed in the "multicast group" section of the stream connection data, via step 52. If the client then hears a valid stream, via step 54, the client may issue a "Mcjoin" request via step 68. If in step 54 the client does not hear a valid stream, a test may be performed to check whether or not a tunnel "paragraph" section is present and valid in the SCD, via step 56. If a tunnel "paragraph" section is not present and valid in the SCD, via step 56, the client may issue a "Mcjoin" request via step 58. If a tunnel interface is possible, via step 56, whether or not a tunnel is presently established may be determined via step 60. If no tunnel is present, a tunnel may then be established via step 62. If this tunnel does not fail, via step 64, the client may again attempt to join a group listed in the "multicast group" section of the stream connection data via step 52. If the tunnel does fail, via step 64, the client may issue a "Mcjoin" request via step 58.

After the "Mcjoin" request is issued, via step 68, step 70 determines whether or not the connection is accepted. If the connection is refused, via step 70, there is a failure via step 72. On the other hand, if the connection is accepted, via step 70, the connection setup process is complete and the client may begin listening to the stream via step 74.

After listening to a short sequence of the stream, via step 74, a test may be performed, via step 76, to check if the sequence is error free. If the sequence is error free, and this sequence is not an "end of stream" packet, then the process may move back to step 74 and the client may again listen to a stream sequence. If an error is found, via step 76, then a retransmission request may be made via step 78. After retransmission, a test may be performed to check its validity, via step 80. If the retransmission received is still not valid, and buffer time has not expired, via step 82, then another request for retransmission may be made. If the retransmission received in step 80 is valid, the process may again revert back to step 74 where the client may again listen to a transmitted sequence. In step 82, if buffer time does expire, an alert application layer process is triggered, which may include dropping the connection, pausing, interpolation of data, ignoring lost data, or any other process deemed appropriate by the application designer via step 84. If at any time, an "end of stream" packet is received without error, whether following a retransmission or not, via step 98, then the process may end via step 100.

Similarly, after the "Mcjoin" request is issued in step 58, the connection must be accepted via step 66. As in step 70, if the connection is refused, via step 66, there is a failure via step 72. If the connection is accepted, via step 66, the connection setup process is complete, and the client may begin processing packet sequences via step 86.

After receiving the first packet, via step 86, a process very similar to that described above via steps 76,78,80,82 and 84 may begin. A test may be performed, via step 88, to check if the sequence is error free. If the sequence is error free, and this sequence is not an "end of stream" packet, then the process may move back to step 86 and the another request may be made for a subsequent packet. If an error is found, via step 88, then a retransmission request may be made, via step 90. After retransmission, a test may be performed to check its validity via step 92. If the retransmission received is still not valid, and buffer time has not expired, via step 94, then another request for retransmission may be made. If the retransmission received in step 92 is valid, the process again reverts back to step 74 where the next packet sequence may be requested. In step 94, if buffer time does expire, an alert application layer process is triggered, which may include dropping the connection, pausing, interpolation of data, ignoring lost data, or any other process deemed appropriate by the application designer via step 96. If at any time, an "end of stream" packet is received without error, whether following a retransmission or not, via step 98, then the process may end via step 100.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A process for a session layer protocol, the process comprising the steps of:
   providing a machine;
   providing a source associated with the machine;
   using a shortcut to request a connection to the source of the machine;
   sending a stream over the connection;
   deciding to accept or reject the connection by the source;
   accepting the connection by the source;
   initiating a passive connection if the passive connection is associated with the stream with no error correction performed;
   joining the machine to an appropriate group;
   receiving packets from the passive connection;
   determining proper ordering and buffer placement of each of the received packets;
   dropping each of the packets from the stream not received within a pre-determined amount of time;
   requesting each of the packets dropped from the stream if the packets are not received; and
   receiving each of the dropped packets.

2. The process of claim 1 further comprising the step of: ensuring each of the packets received is the next one expected.

3. The process of claim 1 further comprising the step of: detecting errors in the stream.

4. The process of claim 1 further comprising the step of: detecting extraneous data in the stream.

5. The process of claim 1 further comprising the step of: embedding the shortcut in a web page.

6. The process of claim 1 further comprising the step of: saving the shortcut in a file.

* * * * *